(12) United States Patent
Okada et al.

(10) Patent No.: US 7,680,335 B2
(45) Date of Patent: Mar. 16, 2010

(54) PRIOR-CONSTRAINED MEAN SHIFT ANALYSIS

(75) Inventors: Kazunori Okada, Plainsboro, NJ (US);
Maneesh K. Singh, Princeton, NJ (US);
Arun Krishnan, Exton, PA (US);
Visvanathan Ramesh, Plainsboro, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 1042 days.

(21) Appl. No.: 11/371,698

(22) Filed: Mar. 9, 2006

(65) Prior Publication Data

US 2006/0242218 A1 Oct. 26, 2006

Related U.S. Application Data

(60) Provisional application No. 60/665,126, filed on Mar. 25, 2005.

(51) Int. Cl.
*G06K 9/46* (2006.01)
*G06K 9/66* (2006.01)

(52) U.S. Cl. .................. 382/190; 382/131; 382/286

(58) Field of Classification Search ............... 382/131, 382/173, 190, 203, 286
See application file for complete search history.

(56) References Cited

U.S. PATENT DOCUMENTS

| | | | | |
|---|---|---|---|---|
| 6,728,334 | B1* | 4/2004 | Zhao | 378/62 |
| 6,947,784 | B2* | 9/2005 | Zalis | 600/425 |
| 7,218,764 | B2* | 5/2007 | Vaisberg et al. | 382/129 |
| 7,519,209 | B2* | 4/2009 | Dawant et al. | 382/128 |

* cited by examiner

*Primary Examiner*—Phuoc Tran
(74) *Attorney, Agent, or Firm*—Donald P. Paschburg; F. Chau & Associates, LLC (57) ABSTRACT

A system and method are provided for prior-constrained mean shift analysis of a data array, the system including a processor, an input adapter in signal communication with the processor for receiving at least one data array, and a prior constraints unit in signal communication with the processor for performing a prior-constrained mean shift analysis on the at least one data array; and the method including receiving initialization data, selecting an initial point relative to the initialization data, Gaussian fitting with a prior-constrained mean shift responsive to the initial point to parse a structure, and setting the parsed structure as a prior constraint.

20 Claims, 7 Drawing Sheets

PRIOR-CONSTRAINED MEAN SHIFT ANALYSIS

CROSS-REFERENCE TO RELATED APPLICATION

This application claims the benefit of U.S. Provisional Application Ser. No. 60/665,126, filed Mar. 25, 2005 and entitled "Prior-Constrained Mean Shift", which is incorporated herein by reference in its entirety.

BACKGROUND

Mean shift is a popular optimization framework for analyzing the structure of kernel-smoothed function surfaces. The mean shift procedure is an adaptive gradient ascent algorithm with automatic step-size selection and is convergent to a mode of the kernel-smoothed estimate of the function surface. The mean shift framework provides an efficient solution to the general data-clustering problem. See K. Fukunaga, Introduction to Statistical Pattern Recognition, Academic Press, San Diego, 1990; Y. Cheng, Mean shift, mode seeking, and clustering, IEEE Trans. Pattern Anal. Machine Intell., 17(8):790-799, 1995; D. Comaniciu and P. Meer, Mean shift: A robust approach toward feature space analysis, IEEE Trans. Pattern Anal. Machine Intell., 24(5):603-619, 2002.

The mode-seeking property of the mean shift algorithm has been successfully applied to a wide range of vision problems such as tracking and segmentation. See D. Comaniciu, V. Ramesh, and P. Meer, Real-time tracking of non-rigid objects using mean shift, In IEEE Conf. Computer Vision and Pattern Recognition, pages 142-149, 2000; R. T. Collins, Mean-shift blob tracking through scale space, In IEEE Conf. Computer Vision and Pattern Recognition, pages 11:234-240, 2003; D. Comaniciu and P. Meer, Mean shift analysis and applications, In Int. Conf. Computer Vision, pages 1197-1203, 1999; K. Okada, D. Comaniciu, and A. Krishnan, Robust anisotropic Gaussian fitting for volumetric characterization of pulmonary nodules in multislice CT, IEEE Trans. Medical Imaging, 24(3):409-423, 2005. Unfortunately, such formulations have difficulty with hard-to-discover weak modes in multimodal data, for example.

SUMMARY

These and other drawbacks and disadvantages of the prior art are addressed by an exemplary system and method for prior-constrained mean shift analysis.

An exemplary system for prior-constrained mean shift analysis of a data array includes a processor, an input adapter in signal communication with the processor for receiving at least one data array, and a prior constraints unit in signal communication with the processor for performing a prior-constrained mean shift analysis on the at least one data array.

An exemplary method for prior-constrained mean shift analysis of a data array includes a processor receiving initialization data, selecting an initial point relative to the initialization data, Gaussian fitting with a prior-constrained mean shift responsive to the initial point to parse a structure, and setting the parsed structure as a prior constraint.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for prior-constrained mean shift analysis in accordance with the following exemplary figures, in which.

DETAILED DESCRIPTION OF PREFERRED EMBODIMENTS

A system and method are provided for prior-constrained mean shift analysis. A prior-constrained mean shift framework is disclosed for incorporating prior information from independent sources with a mean shift-based data-driven mode analysis. When the prior information is represented using a data point with a corresponding Gaussian distribution, the modified mean shift mode seeker can be pulled towards a desired location in the data-space, known as an attractive prior, or pushed away from such a location, known as a repulsive prior. Using a variational optimization formulation via construction of quadratic lower and upper bounds, the prior constrained mean shift step can be understood as an information fusion of the data, known as density or scale-space mean shift, with the prior in the sense of the Best Linear Unbiased Estimator (BLUE).

An Inhibition Of Return (IOR) algorithm is provided to parse the modes of multimodal data using the disclosed framework. Apart from the obvious use in deriving data-driven maximum a posteriori estimators, the above formulation offers flexible control of the data-driven mean shift algorithm and is useful for semi-automatic segmentation tasks in Computer-Aided Diagnosis (CAD) and data parsing. These aspects of the disclosed formulation are described and demonstrated with an exemplary application for semi-automatic segmentation of lung nodules. In particular, results demonstrate that the algorithm can successfully segment the difficult wall-attached cases.

Figure 1:
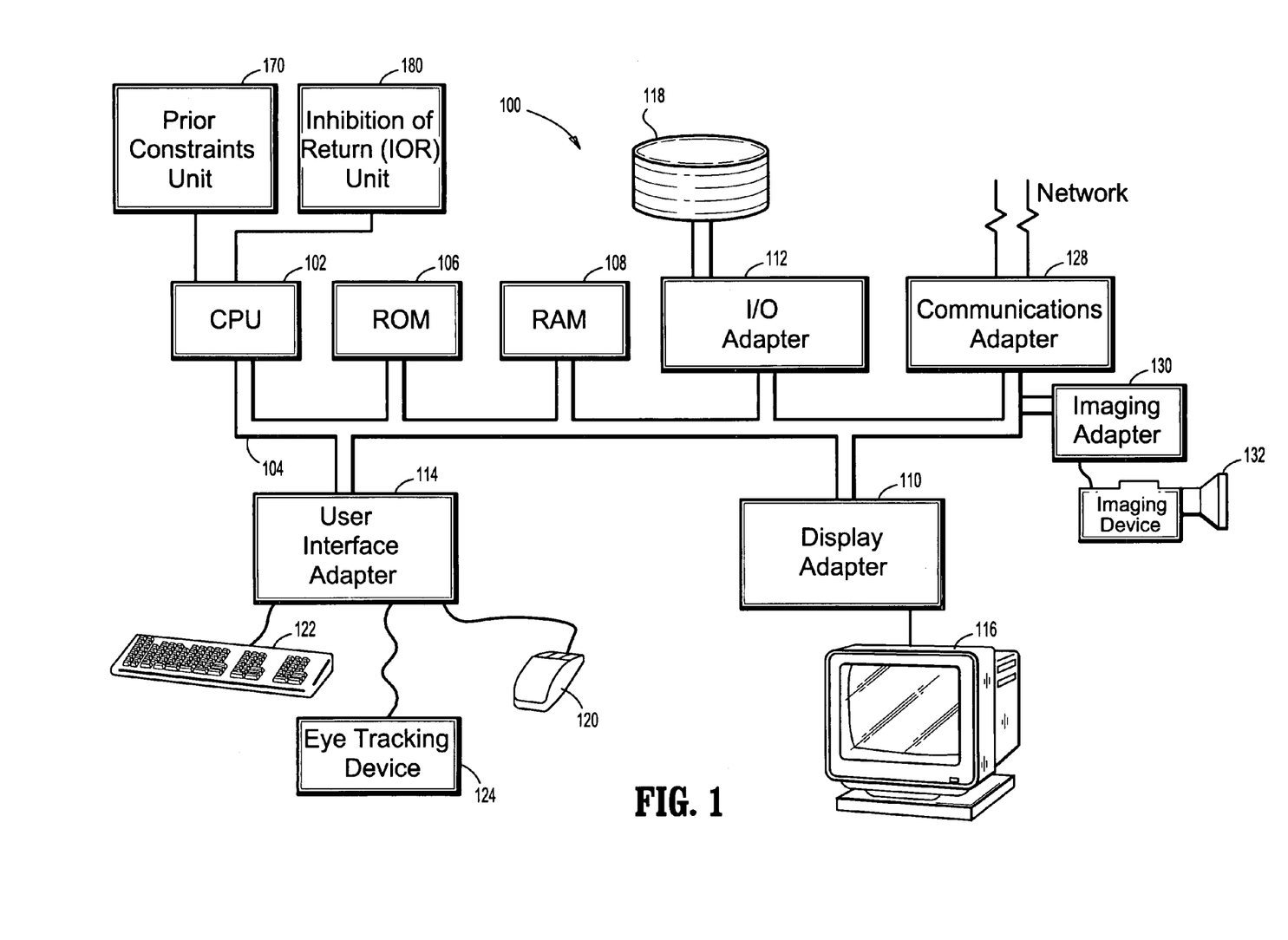
FIG. 1 shows a schematic diagram of a system for prior-constrained mean shift analysis in accordance with an illustrative embodiment of the present disclosure.

As shown in FIG. 1, a system for prior-constrained mean shift analysis, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. An imaging device 132 is in signal communication with the system bus 104 via the imaging adapter 130.

A prior constraint unit 170 and an inhibition of return (IOR) unit 180 are also included in the system 100 and in signal communication with the CPU 102 and the system bus 104. While the prior constraint unit 170 and the inhibition of return unit 180 are illustrated as coupled to the at least one processor or CPU 102, these components are preferably embodied in computer program code stored in at least one of the memories 106, 108 and 118, wherein the computer program code is executed by the CPU 102.

In alternate embodiments of the apparatus 100, some or all of the computer program code may be stored in registers located on the processor chip 102. In addition, various alternate configurations and implementations of the prior constraint unit 170 and the inhibition of return unit 180 may be made, as well as of the other elements of the system 100.

Figure 2:
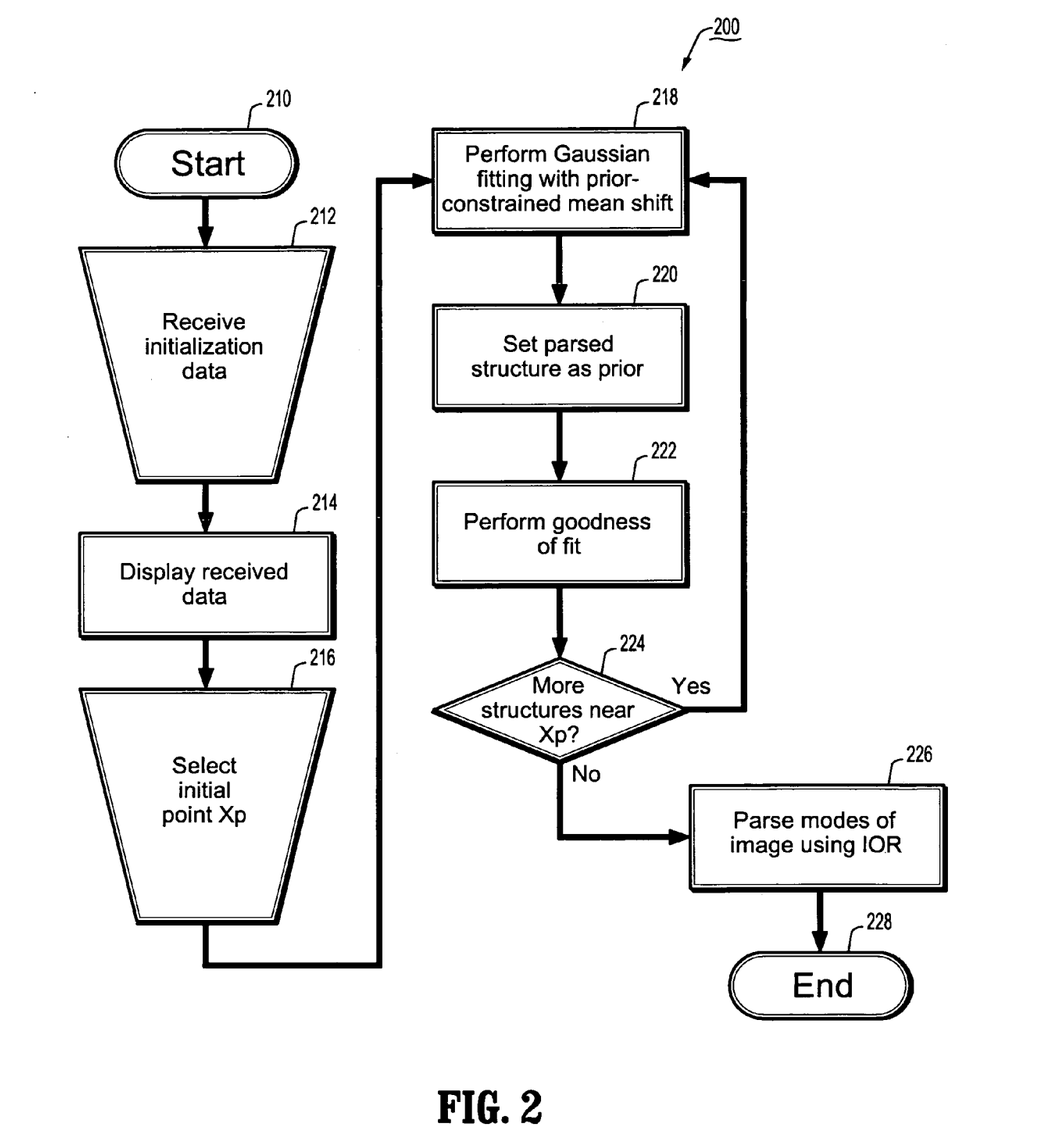
FIG. 2 shows a flow diagram of a method for prior-constrained mean shift analysis in accordance with an illustrative embodiment of the present disclosure.

Turning to FIG. 2, a method for prior-constrained mean shift analysis is indicated generally by the reference numeral 200. The method includes a start block 210 that passes control to a first input block 212. The first input block 212 receives initialization data and passes control to a function block 214. The function block 214 displays the received data and passes control to a second input block 216. The second input block 216 selects an initial point Xp and passes control to a function block 218. The function block 218 performs Gaussian fitting with prior-constrained mean shift and passes control to a function block 220. The function block 220, in turn, sets the parsed structure as a prior constraint and passes control to a function block 222. The function block 222 performs a goodness of fit and passes control to a decision block 224. The decision block 224 determines whether there are more structures near Xp, and if so, passes control back to the function block 218. If not, the decision block passes control to a function block 226. The function block 226 parses modes of the image using inhibition of return (IOR) and passes control to an end block 228.

Thus, the algorithm uses initialization data and an initial point Xp, and loops until no structure is found near Xp. It performs Gaussian fitting with the prior-constrained mean shift constrained by prior repellers. It sets the m-th parsed structure, the m+l-th prior, and performs a goodness of fit test after the first iteration based on a chi-square measure. If the initial fit is verified as a good fit, no further process is performed. This IOR-based algorithm results in a set of blob structures located near Xp.

Figure 3:
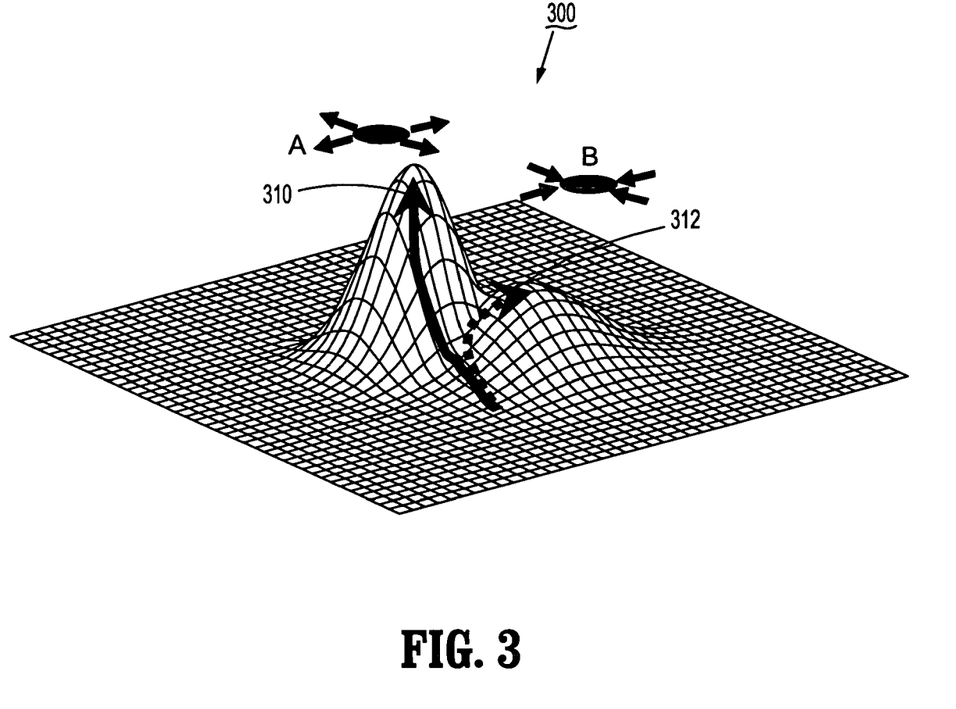
FIG. 3 shows a graphical diagram of a prior-constrained mean shift for a synthetic bimodal case in accordance with an illustrative embodiment of the present disclosure.

Turning now to FIG. 3, a conceptual illustration of the prior-constrained mean shift with a synthetic bimodal case is indicated generally by the reference numeral 300. Here, the schematic point A represents a repulsive or negative prior constraint. The schematic point B represents an attractive or positive prior constraint. The trajectory 310 indicates a data-driven convergence, while the trajectory 312 indicates a prior-constrained convergence.

Figure 4:
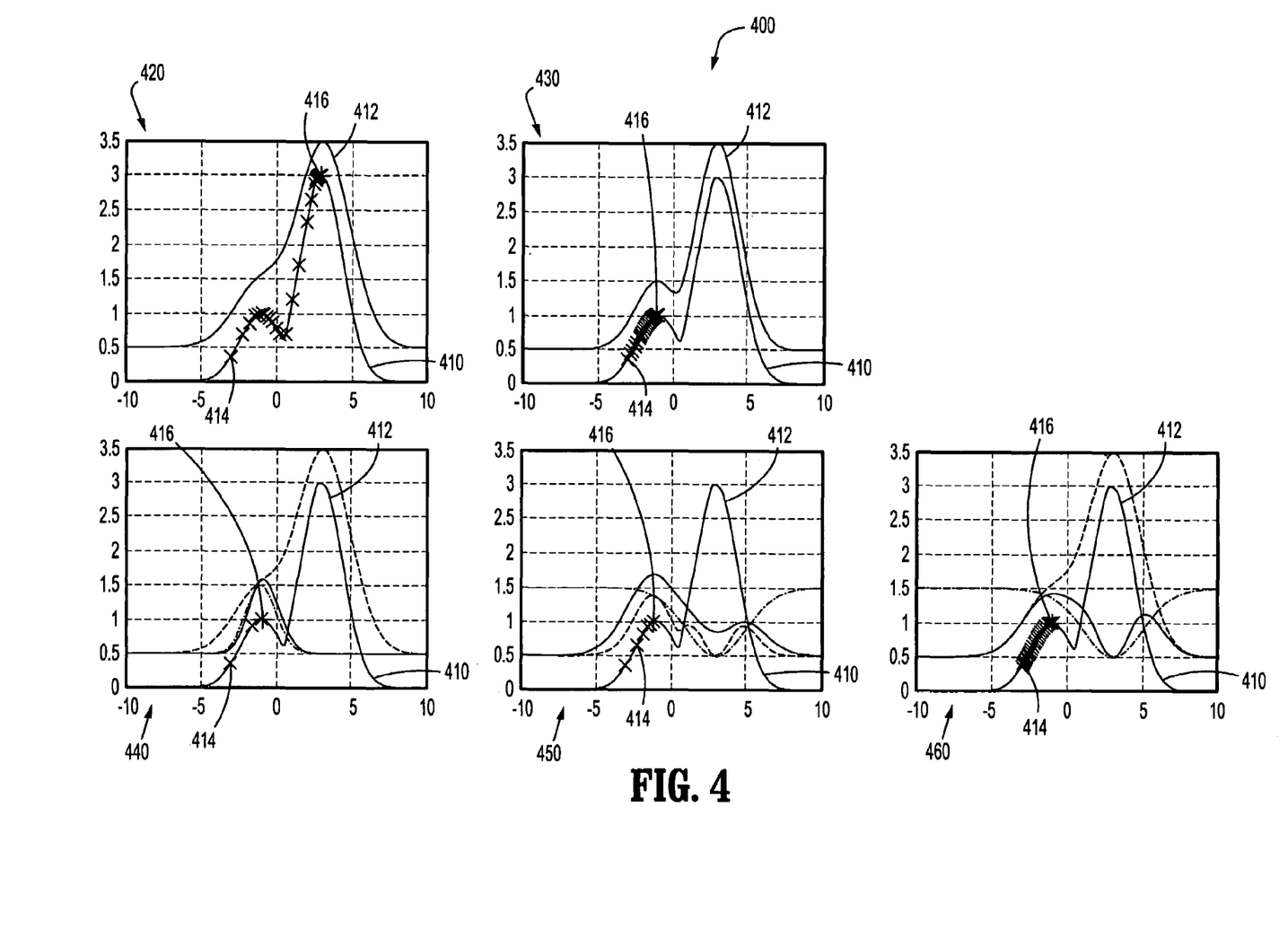
FIG. 4 shows a graphical diagram of a prior-constrained mean shift with one-dimensional (1D) bimodal data in accordance with an illustrative embodiment of the present disclosure.

As shown in FIG. 4, a prior-constrained mean shift with one-dimensional (1D) bimodal data is indicated generally by the reference numeral 400. The input data 410 consists of two Gaussian components centered at −1 and 3. The curves 412 with a 0.5 vertical bias show the scale-space function to be optimized for each case. The "x" iterations 414 are initialized at −3. The "+" 416 indicates convergence. At the top-left, a scale-space mean shift (SSMS) 420 with a large bandwidth is shown. At the top-right, another SSMS 430 with a small bandwidth is shown. At the bottom-left, a variational attractor-constrained mean shift 440 is shown. The bottom-middle shows a resampling-based repeller-constrained mean shift 450. The bottom-right shows a variational repeller-constrained mean shift 460.

Figure 5:
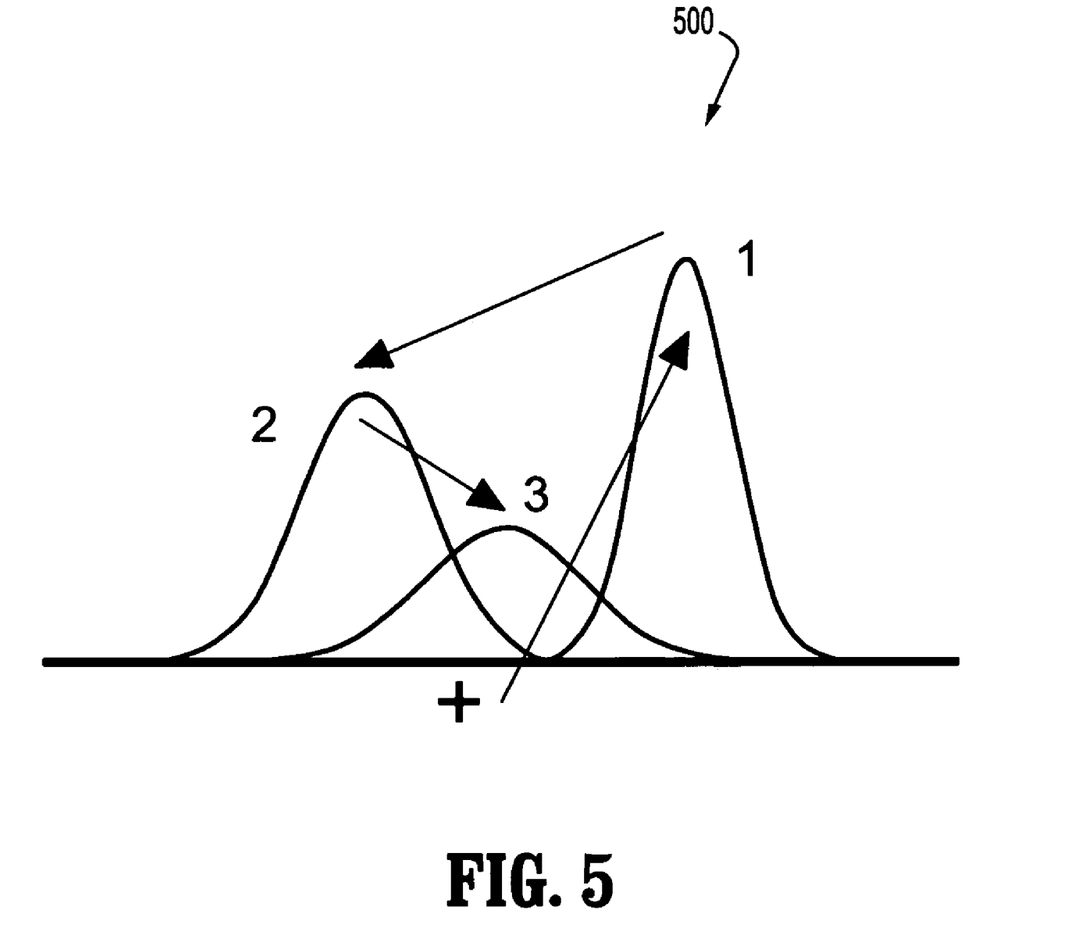
FIG. 5 shows a graphical diagram of local data parsing by an inhibition of return (IOR) algorithm in accordance with an illustrative embodiment of the present disclosure.

Turning to FIG. 5, local data parsing by the inhibition of return (IOR) is indicated generally by the reference numeral 500. Here, the center and the boundary of the target are characterized by the mean and the covariance of the fitted Gaussian. The basin of attraction of the mean by the scale-space mean shift defines a data space neighborhood where the model's approximation is valid. In order to handle a range of target sizes, a multiscale analysis with a set of discrete analysis scales is carried out. For each analysis scale, the center and the anisotropic spread are estimated by the mean shift procedure followed by mode analysis using Gaussian fitting. The mean is estimated by the convergence of the majority of data points sampled around a point Xp by using the scale-space mean shift. The spread is estimated by a constrained least-squares solution to a set of linear matrix equations consisting of L-normalized scale-space derivatives. The derivatives are sampled along the convergent trajectories of the scale-space mean shifts initialized at points around the estimated center. The above scale-space analyses result in a set of estimate pairs.

A stability-based scale/bandwidth selection process uses a normal form of the Jensen-Shannon divergence criterion to select the most stable estimate from among this set, and the neighborhood parameter is set to 1. The resulting multiscale Gaussian model fitting solution is robust against i) the influence from non-target neighboring structures by the robust estimation technique to remove outliers using the mean shift convergence, ii) the non-Gaussianity of the data by using a stability-based scale selection criterion that is insensitive to such modeling errors, and iii) the variations due to the initialization Xp by using a robust extension to the least-squares approach.

Figure 6:
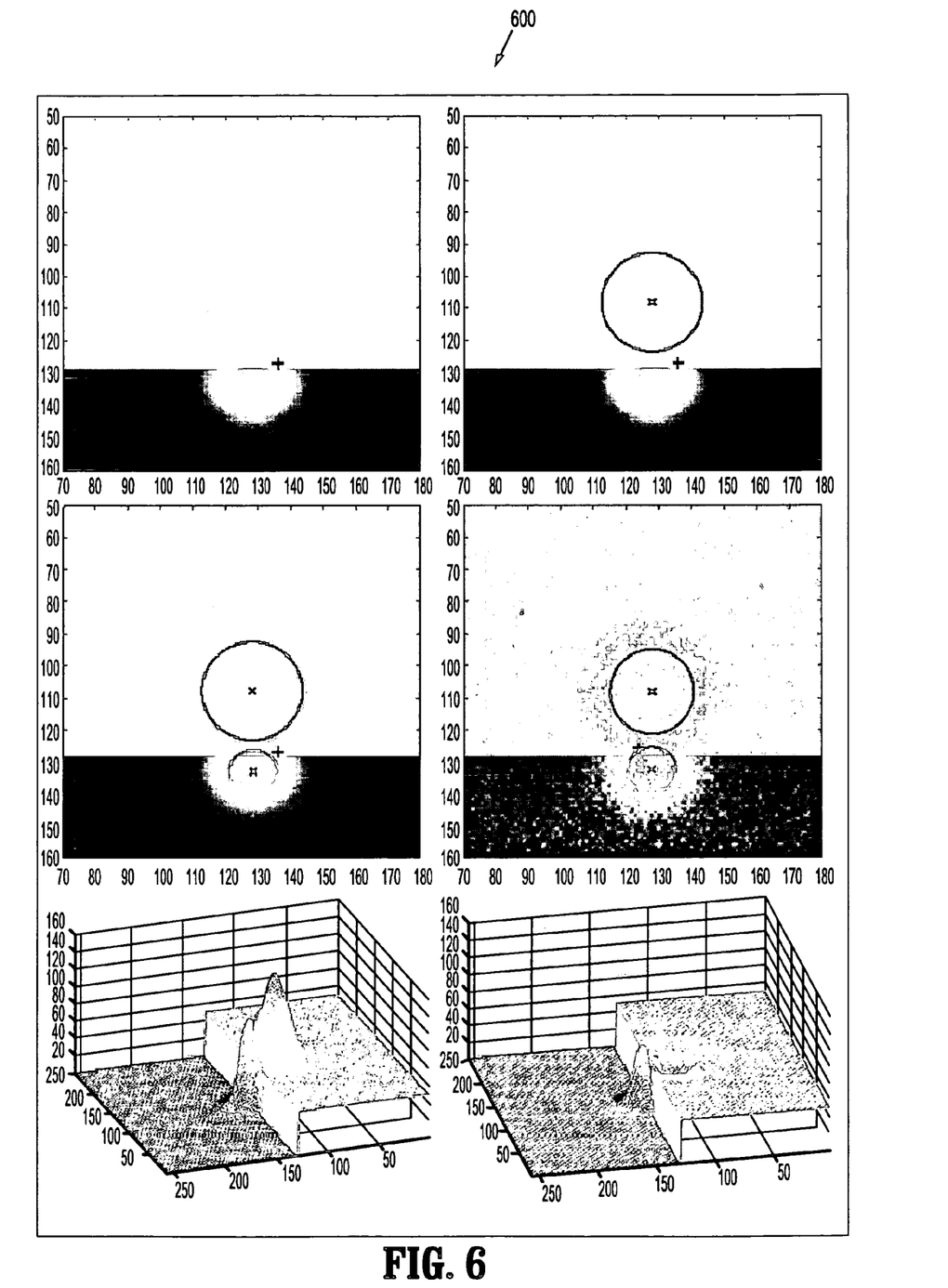
FIG. 6 shows a graphical diagram of a two-step IOR-based data analysis evaluated with two-dimensional (2D) synthetic data in accordance with an illustrative embodiment of the present disclosure.

Turning now to FIG. 6, a two-step IOR-based data analysis evaluated with 2D synthetic data is indicated generally by the reference numeral 600. From is top-left to bottom-right: A) input data, B) result of the initial Gaussian fit from the initial point "+", C) result of the second step with the prior-constrained MS capturing the tumor correctly, D) result of the second step with the same data with white noise and different initialization, E) initial weights, F) weights constrained by the repulsive prior. When the initial fit fails according to the measure, however, a repulsive prior is set and the next iteration of the IOR algorithm is carried out. For example, two iterations may be used.

Figure 7:
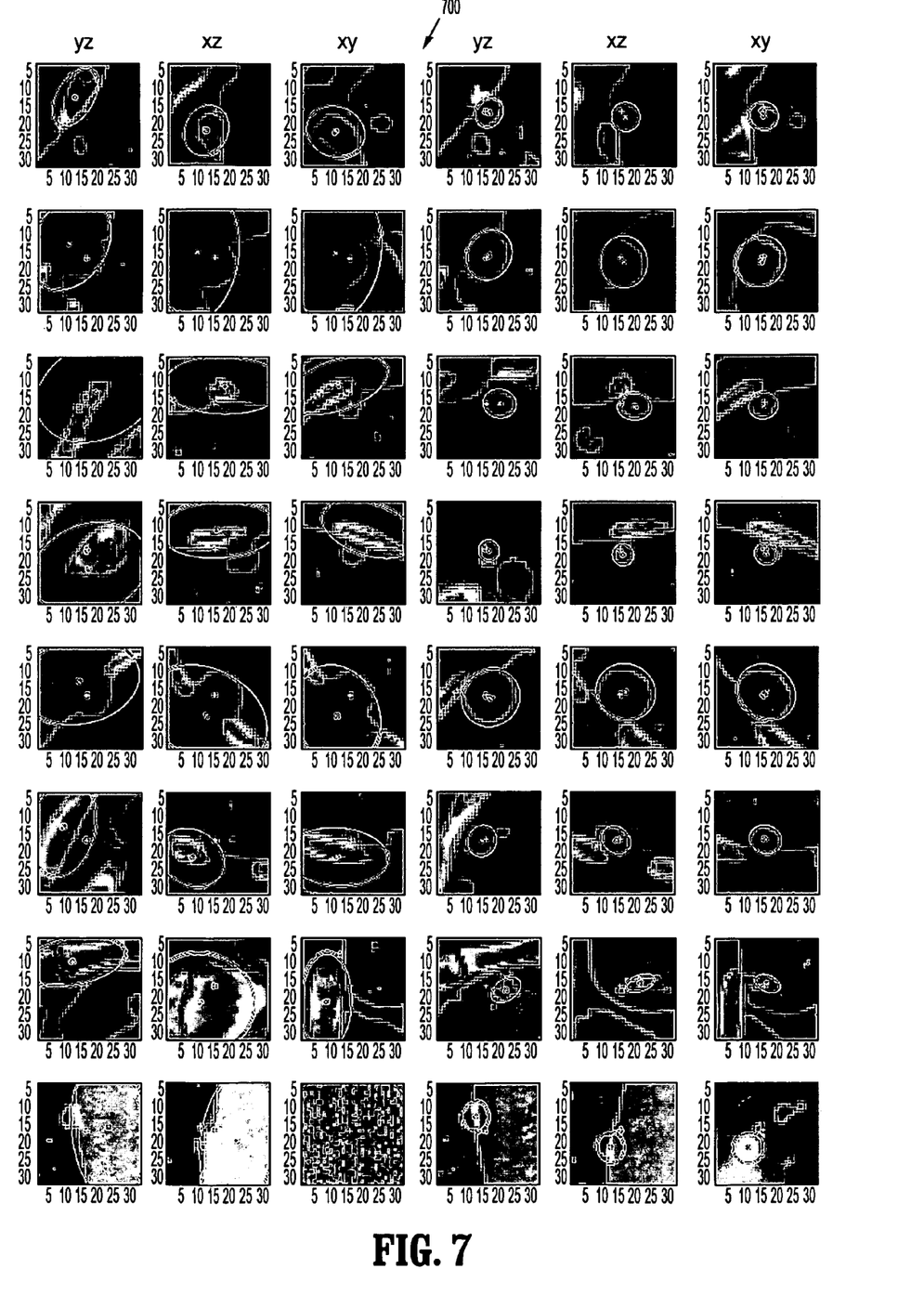
FIG. 7 shows a graphical diagram of exemplary results in accordance illustrative embodiments of the present disclosure.

As shown in FIG. 7, eight illustrative examples are indicated generally by the reference numeral 700. The left three columns show the original failed segmentation results in three orthogonal cross-sections, respectively, while the right three columns show the segmentation results with the prior constraints. Note that the original and the present results are shown in different cross sections of the same volumes thus they appear differently.

In operation of preferred embodiments, a generalization of the mean shift framework operates by providing a mechanism to incorporate spatial priors for controlling where the mean shift converges. The resultant formulation can be used to incorporate other sources of information that are independent of the data sample. Embodiments may include, for example, i) user-assisted control in Computer-Aided Diagnosis (CAD) through a user interface (UI), ii) incorporation of priors constructed from the information provided by domain-experts, and iii) recursive parsing of multimodal data through post-process convergence diagnostics. A key advantage of the disclosed formulation is to detect hard-to-discover weak modes in multimodal data. Mean-shift seeks data-modes through kernel smoothing of the associated density function. The analysis bandwidth may be chosen to optimize a performance criterion and is dictated by global statistical properties of data, such as noise, smoothness, and the like. Such smoothing can, therefore, mask smaller modes located close to larger ones. The small or weak modes might be very important in certain situations, such as, for example, in CAD for detecting convex-shaped tumors or nodules attached to large wall-like or tubular structures. The present formulation enables the mean shift algorithm to detect these weak modes.

Referring back to FIG. 3, such a situation is illustrated using a bimodal density function with a weak and a strong mode located nearby. Although initialization is carried out nearer to the desirable mode, the data-driven convergence, with the best choice of the bandwidth matrix, is to the farther but stronger mode. The path of convergence is charted with the solid arrow. Disclosed are two different types of priors: i) a repulsive prior, depicted as an ellipse and a data location by point A, which pushes the convergence away from the data-driven convergence, and ii) an attractive prior, depicted by point B, which pulls the convergence towards the small target mode. The dashed arrow shows the convergence path to the desired mode for the prior-constrained mean shift. These priors are modeled using a data point with a corresponding region of confidence or distribution around it. More specifically, this distribution is modeled as a Gaussian function. This results in a modified mean shift algorithm, each step of which is a fusion of information from the data density mean shift and the prior in the Best Linear Unbiased Estimator (BLUE) sense.

There are several sources of information that can be incorporated through constructing priors. It is of great interest to automatically construct such priors from the data itself for recursively parsing the multimodal data. To address this task, an Inhibition Of Return (IOR) algorithm is presented, which recursively seeks data modes using the prior-constrained mean shift algorithm. At each mode of convergence, robust Gaussian model fitting is performed to construct a repulsive prior, which enables the IOR algorithm to sequentially visit all the data modes near the initialization point. This algorithm is similar to the IOR-based visual attention model. The disclosed formulation is developed for the mean shift approach as applied to the Gaussian scale-space. In alternate embodiments, a more general framework may be used, such as, for example, subsuming the Gaussian scale-space. These and other modifications and embodiments will be apparent to those of ordinary skill in the pertinent art based on the description of exemplary embodiments provided herein.

The scale-space mean shift itself, together with automatic scale selection, provides a powerful tool for vision problems such as medical image segmentation, and scale and affine invariant feature detection. The usefulness of the disclosed framework is demonstrated for semi-automatic three-dimensional (3D) segmentation of lung tumor nodules. In particular, the results show that preferred embodiments can successfully segment the difficult wall-attached cases that other state-of-the-art systems fail to segment.

In subsequent sections, the present disclosure summarizes the general mean shift framework, and then describes the prior-constrained mean shift formulation. Data-driven kernel density estimates are modified to incorporate independent priors and variational optimization theory is used to construct bounds on the likelihood functions to derive provably convergent mean-shift like mode-seeking algorithms. An exemplary problem domain, semi-automatic 3D segmentation of lung tumor nodules, is introduced as the application test bed. In addition, an IOR-based data-parsing algorithm is described, which uses prior-constrained mean shift to address the above problem. Empirical evaluation for the application test bed shows the utility of the disclosed formulation in segmenting the difficult wall-attached lung tumor nodules.

Mean Shift Algorithms are summarized here in terms of the general mean shift framework. Kernel density estimation (KDE) or Parzen windows is a data-driven nonparametric technique for estimating the generative probability distribution associated with data samples. Given a sample set from a random variable X, the kernel estimate for the underlying density of the random variable X is a function of the associated bandwidth. Mean-shift is a popular hill-climbing algorithm for iteratively seeking modes of such distributions and clustering data according to the modes.

From an optimization-theory perspective, mean shift is a variational optimization algorithm. For a class of density kernels having convex profiles, the convexity property yields quadratic lower bounds of the density. These quadratic lower bound functions are then readily optimized to derive the next location in the mean shift algorithm and guaranteed to converge to a local maximum of the density function from any given point in the data space. For the Epanechnikov kernel, the algorithm is the well-known mean shift algorithm. For other kernels, such as the Gaussian kernel, for example, it leads to a mean shift step in the form of a weighted arithmetic mean.

Beyond kernel density estimation, the mean shift framework discussed above can be applied to a general class of functions constructed using kernel smoothing. Since the Gaussian scale-space can also be interpreted as a family of kernel-smoothed functions, it is possible to derive a mean shift algorithm in this domain.

Positive-valued image data may be analyzed with coordinates indicating data pixel and/or voxel location. Gaussian scale-space provides a solution to the diffusion equation with an initial condition. It takes the form of convolution of the image data with a Gaussian kernel. Scale-space mean shift may be derived by maximizing the quadratic lower bound constructed using the convexity of a profile, resulting in the form proportional to the spatial gradient of the scale-space.

An iterative procedure over the discretized data space is defined analogous to the density mean shift. The scale-space mean shift vector can be understood as a mean shift with positive-valued weights of intensity, by definition. The convergence of such a weighted mean shift to the local maximum of the scale-space L is also guaranteed.

Mean-shift analysis presented above is data-driven. That is, it is not constrained by any top-down prior knowledge. This section develops models for those scenarios when such knowledge is indeed available, using mean shift constrained by Gaussian priors.

Classical or density mean shift can be interpreted in the following Maximum Likelihood (ML) sense. Given data samples, a kernel density estimate is used to predict the likelihood distribution of X. A mean-shift algorithm can then be understood as an ML estimator if the distribution is unimodal. In case of a multimodal distribution of X, each locally maximum likelihood location can be parsed and the ML estimate can be found. Mode parsing is discussed later in this disclosure.

Suppose now that the present embodiments have another source of information for X. Under the condition of independence, the likelihood from this source can then be multiplied to constrain the likelihood from the kernel density estimator. The constrained mean shift formulae for Gaussian scale-space is derived by treating $L(x;h)$ as a pseudo-likelihood. However, the results can be readily extended to the general true likelihoods such as the original density mean shift.

For the case of an attractive prior, let such a prior for X be given by a Gaussian distribution. This prior can be used to bias or attract the solution towards a pre-conceived point in the data space. Hence the present embodiments call it an attractive prior. The Gaussian scale-space function can be rewritten in the discretized data space as a Gaussian-weighted image intensity function summed over N, the number of data points or pixels. By treating the Gaussian scale-space as a likelihood function, the present embodiments multiplicatively modify the likelihood with the prior, resulting in the constrained scale-space function. When there are multiple independent priors, the likelihood function can be determined by using the same method sequentially. The constrained mean shift vector is derived as a variational quadratic bound optimizer of the constrained scale-space likelihood.

The convergence of the associated mean shift procedure is guaranteed. Note the equivalence of the constrained mean shift step to the Best Linear Un-biased Estimator (BLUE) with two independent Gaussian information sources. Thus, each derived step can be interpreted as a BLUE fusion of the Gaussian prior and the data-driven scale-space mean shift. The confidence level the present embodiments associate with the prior can be controlled by varying the parameters. As the present embodiments decrease a parameter, the confidence in the prior increases. With the highest confidence, the solution reduces to the most likely spatial point indicated by the prior. On the other hand, as the parameter increases, the confidence in the prior decreases. The mean shift step converges to the original scale-space mean shift step.

In some situations, the prior information available can be in form of a negation or repulsive prior. That is, it is unlikely for a certain parameter to take some specific values. Such a prior can be used to repel or push away the convergence from a given point. Thus the present embodiments call it a repulsive prior and define it with the inverse Gaussian form using the positive Gaussian prior appropriately truncated and normalized over a finite domain.

To incorporate the repulsive prior, the present embodiments draw from the theory of data resampling. One way to incorporate priors is to resample, or to associate weights to already available data to denote the notion that some data points are more likely to occur than others. This second option of associating weights lets us define kernel density estimates that are biased by prior knowledge. With each observation, let us associate prior-induced positive weights. For the case with multiple priors, the present embodiments may define multiple weights. For a single repulsive Gaussian prior, the modified scale-space function can be derived. For the mean shift vector with the repulsive or negative Gaussian constraint, it is straightforward to show the mean shift step.

The convergence property is maintained for the mean shift procedure with this form of optimizer steps. On the other hand, the present embodiments can treat a pseudo-likelihood by imposing an appropriate normalization. Therefore, it is possible to consider constraining the kernel-smoothed likelihood multiplicatively as described above, resulting in a constrained likelihood.

Variational optimization is not as straightforward since the second negative term cannot be lower-bounded by using the convex property of the exponential kernel. In fact, a quadratic upper bound of the exponential is required for the desired variational transformation. An analytic expression of such a quadratic upper bound can be derived by constructing the first-order Taylor series expansion of the kernel function. The quadratic Lagrange remainder term is then maximized over the free variable to yield a quadratic upper bound for the remainder term. Since this upper bound provides a quadratic lower bound to the negative term, the present embodiments can derive a mean-shift formulation to seek the mode along lines similar to the positive prior case.

The derived optimizer step can be interpreted as the BLUE fusion of two Gaussian sources with more complex mean and covariance terms than the attractive case. Note that when the current point XQ is asymptotically far from the prior located at the point "a", the mean-shift step reduces to be the simplified BLUE fusion of the data-driven scale-space mean shift step and "a".

Referring back to FIG. 4, a prior-constrained mean shift with 1D bimodal data. The input data 410 consists of two Gaussian components centered at −1 and 3. The solid curve 412 with a 0.5 vertical bias show the function to be optimized for each case. This synthetic example shows 1D simulation of the prior-constrained mean shift algorithms with the attractive and repulsive priors. The 1D bimodal image data illustrates a situation similar to that of FIG. 3. As shown in the figure, the initialized scale-space mean shift converges to the stronger right peak (top-left), missing the weaker left peak that can be found with a smaller analysis bandwidth (top-right). Using the same bandwidth, the prior-constrained mean shift algorithms are controlled to converge to the weaker peak by setting the attractive (bottom-left) and repulsive (bottom-middle and bottom-right) priors appropriately (shown in dot-dashed curves).

As a practical application of the above framework, the present embodiments apply the prior-constrained mean shift algorithm to the semi-automatic segmentation problem, or semi-automatic blob segmentation using robust Gaussian fitting. The present embodiments follow the robust scale-space Gaussian fitting approach and describe it briefly below. The problem is to segment a multivariate blob-like target structure indicated roughly by a single initialization marker Xp placed by a user. The segmentation is provided by a process that finds blob structures in the data and uses mean shift to robustly fit a following Gaussian-based model.

Referring back to FIG. 5, local data parsing by the inhibition of return is discussed. Here, the center and the boundary of the target is characterized by the mean and the covariance of the fitted Gaussian. The basin of attraction of the mean by the scale-space mean shift defines a data space neighborhood where the model's approximation is valid. In order to handle a range of target sizes, a multiscale analysis with a set of discrete analysis scales is carried out. For each analysis scale, the center and the anisotropic spread are estimated by the mean shift procedure followed by mode analysis using Gaussian fitting. The mean is estimated by the convergence of the majority of data points sampled around Xp by using the scale-space mean shift. The spread is estimated by a constrained least-squares solution to a set of linear matrix equations consisting of L-normalized scale-space derivatives. The derivatives are sampled along the convergent trajectories of the scale-space mean shifts initialized at points around the estimated center.

The above scale-space analyses result in a set of estimate pairs. A stability-based scale/bandwidth selection process uses a normal form of the Jensen-Shannon divergence criterion to select the most stable estimate from among this set, and the neighborhood parameter a is set to 1. The resulting multiscale Gaussian model fitting solution is robust against i) the influence from non-target neighboring structures by the robust estimation technique to remove outliers using the mean shift convergence, ii) the non-Gaussianity of the data by using a stability-based scale selection criterion that is insensitive to such modeling errors, and iii) the variations due to the initialization Xp by using a robust extension to the least-squares approach.

Local data parsing by inhibition of return is now discussed. Automatic data and mode parsing algorithms are useful for representing and processing structures in multimodal data. However they suffer from the same inability to detect weak data modes as was discussed in the background. In an earlier section, the present embodiments disclosed the prior-constrained mean shift as a solution to detect these modes. To solve the parsing problem, the present embodiments disclose a novel inhibition of return (IOR) framework using the prior-constrained mean shift. The idea here is to iteratively perform the aforementioned Gaussian fitting-based segmentation by successively setting repulsive priors at the consecutive points of mean shift convergence. The present embodiments use the resampling-based repulsive prior disclosed above.

Use of the variational repulsive prior in this context and its comparative analysis is also of interest. This procedure traverses from mode to mode starting from an arbitrary initial point, parsing all the blob-like data structures located nearby as illustrated in FIG. 5. This parsing process is efficient because each detected mode is inhibited from being revisited by setting a repulsive prior. This IOR concept was first suggested for a computational model of visual attention. However, that neural network-based implementation is unlike the present approach.

Referring back to FIG. 2, the following describes the algorithm using initialization data and initial point Xp. Loop until no structure is found near Xp. Perform Gaussian fitting with the prior-constrained mean shift constrained by repellers, followed by saving the m-th parsed structure and setting the m+1-th prior. This IOR-based algorithm results in a set of parsed blob structures located near Xp.

In an exemplary lung nodule segmentation application, the present embodiments apply a 3D implementation of the IOR-based local data analysis to semi-automatic segmentation of lung nodules. In the past decades, a large amount of work has been done in computer-aided detection and segmentation of lung nodules towards improving mortality rates of lung cancers. Recently, more sophisticated solutions for this purpose have been disclosed by taking advantage of increased image quality and resolution with the enhanced computed tomography (CT) scanners. Despite the improvements, however, the problem remains open due to the data's natural complexity. For example, many lung nodules are attached or located nearby other non-target structures such as lung wall and vessels. Because the intensity values of these structures can be similar to those of the nodules, separating them from such structures is not trivial.

The scale-space Gaussian fitting solution described in a section above addresses this issue by incorporating geometric constraints, however it still fails to segment many nodules located near or attached to neighboring structures as shown in FIG. 5. These failures are caused because the target nodules are located near rib bones, which have much higher intensity values than nodules, thus falsely attracting the scale-space mean shift convergence. This is precisely the situation, as illustrated in FIG. 3, in which the prior-constrained mean shift framework is designed to be effective. The present embodiments disclose an IOR-based solution for this purpose. After the first iteration, the present embodiments perform a goodness of fit test based on chi-square measure after the step 2. If the initial fit is verified as a good fit, no further process is performed.

Referring back to FIG. 6, a two-step IOR-based data analysis evaluated with 2D synthetic or toy data will be addressed. For testing the feasibility, the present embodiments first evaluated a 2D version of the system on synthetic data as shown in FIG. 6. Emulating the wall-attached nodule case, the data is constructed with a step function for lung wall, a large Gaussian with higher intensity for bone, and a small truncated Gaussian with lower intensity for wall-attached nodule. The results demonstrate that our solution correctly finds and segments the difficult target structure with the presence of a stronger mode, white noise, and variation in the initialization as shown in the middle row of FIG. 6.

A 3D implementation of the two-step IOR data-parsing algorithm is applied to a clinical data set of the thin-section (1.25 mm slice thickness) chest high-resolution computed tomography (HRCT) images, including 39 patients with a total of 1310 nodules. The data is recorded with Multislice CT scanners and anonymatized. Each volumetric image consists of 12-bit positive values over an array of 512×512 lattices. The implementation of the Gaussian fitting algorithm follows the settings described. This resulted in 106 verified failure cases. Most of these failures were the wall-attached cases and they were correctly segmented by our data parsing solution with the prior-constrained mean shifts.

Referring back to FIG. 7, eight illustrative examples for such cases are shown. The eight examples of 3D tumor segmentation results are shown with and without the repulsive prior. Each row shows the results for each example. The left three columns show the original failed segmentation results in three orthogonal cross-sections, respectively, while the right three columns show the segmentation results with the prior constraints. The ellipses indicate an image-plane intersection of 35% confidence ellipsoid of the estimated Gaussian. Note that the original and our results are shown in different cross sections of the same volumes, thus they appear differently.

The present disclosure has introduced a novel framework for incorporating spatial priors to the mean shift-based data-driven mode analysis. The present embodiments introduce attractive and repulsive priors in the Gaussian form into the scale-space mean shift framework. The present embodiments also disclose two novel, provably convergent, modified mean-shift algorithm embodiments. Variational optimization techniques are used to derive the algorithms by finding quadratic bounds to the Gaussian kernel. In particular, the present embodiments disclose a novel quadratic upper bound to the Gaussian kernel. Further, the present embodiments disclose a mode-parsing algorithm based on the IOR approach using the prior-constrained mean shift formulation. This algorithm is then successfully applied to the semi-automatic 3D lung tumor segmentation problem to segment difficult wall-attached cases. Another contribution is the result showing that the prior-constrained mean shift step can be understood as an information fusion of the data for scale-space mean shift, and the prior in the sense of the Best Linear Unbiased Estimator.

The present disclosure sets forth a general framework for combining data-driven statistical analysis with prior information in order to provide effective and usable vision solutions. The contributions of the present disclosure are general, and the disclosed formulation can be extended in at least the following ways in alternate embodiments: i) defining the prior-constrained mean shift in the kernel density estimate domain, ii) modeling the prior with a mixture of Gaussians, iii) applications other than segmentation such as tracking, and iv) adapting the IOR-based mode parsing algorithm to more flexible visual search by updating the initialization at each convergence.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for identifying a structure of interest within image data, comprising:
   receiving image data;
   receiving an initial point within the received image data;
   transforming the received image data into a scale-space;
   performing geometric fitting using prior-constrained mean shift on the scale-space image data to identify a structure candidate in a vicinity of the initial point;
   using the identified structure candidate to set up a prior constraint for subsequent iterations;
   presenting the identified structure candidate to a user and querying the user to determine whether the identified structure candidate is a structure of interest; and
   when the identified structure candidate is determined to not be a structure of interest, repeating the steps of performing geometric fitting using prior-constrained mean shift and presenting an identified structure candidate until it is determined that an identified structure candidate is a structure of interest,
   wherein the above steps are performed by a computer system.

2. The method of claim 1, wherein each time the step of geometric fitting is performed, a new point is selected in place of a previous point, the new point being in proximity to the previous point such that a non-repetitive sequence of geometric structures are identified within the image data via an automatic exploration of the image data that starts from the initial point.

3. The method of claim 2, wherein a repulsive prior is used to ensure that each selected new point is different from previously selected points.

4. The method of claim 2, wherein an attractive prior is used to ensure that each selected new point is different from previously selected points.

5. The method of claim 1, wherein the geometric fitting is a Gaussian fitting.

6. The method of claim 1, wherein repeating the steps of performing geometric fitting and presenting an identified structure candidate utilizes inhibition of return (IOR) using a repulsive prior to ensure that geometric fitting provides a different identified structure candidate at each repetition.

7. The method of claim 1, wherein a goodness fit is performed on the identified structure candidate prior to presenting the identified structure candidate.

8. The method of claim 1, wherein the step of geometric fitting includes utilizing an adaptive gradient ascent technique with automatic step-size selection that is convergent to a mode of a kernel-smoothed estimate of a Gaussian function surface.

9. The method of claim 1, wherein the identified structure candidate is a mode in the scale-space representation of the image data.

10. The method of claim 1, wherein the identified structure candidate is a mode in a kernel density estimate on data sample corresponding to the image data.

11. The method of claim 1, wherein the image data comprises three-dimensional computed tomography (CT) data and the identified structure candidate is indicative of a lung nodule.

12. The method of claim 11, wherein the identified the structure candidate comprises semi-automatic segmentation of wall-attached lung nodules.

13. A system for identifying a structure of interest within image data, comprising:
   an image receiving unit for receiving image data;
   a first graphical user interface for displaying the received image data and soliciting an initial point within the received image data from a user;
   an image processing unit for transforming the received image data into a scale-space for performing geometric fitting using prior-constrained mean shift on the scale-space image data to identify a structure candidate in a vicinity of the initial point and for setting up a prior constraint for subsequent iterations; and
   a second graphical user interface for presenting the identified structure candidate to a user and querying the user to determine whether the identified structure candidate is a structure of interest,
   wherein when the identified structure candidate is determined to not be a structure of interest, performing geometric fitting using prior-constrained mean shift and presenting an identified structure candidate are repeated until it is determined that an identified structure candidate is a structure of interest.

14. The system of claim 13, wherein each time the step of geometric fitting is performed, a new point is selected in place a previous point, the new point being in proximity to the previous point such that a non-repetitive sequence of geometric structures are identified within the image data via an automatic exploration of the image data that starts from the initial point.

15. The system of claim 13, wherein the geometric fitting is a Gaussian fitting.

16. The system of claim 13, wherein repeating the steps of performing geometric fitting and presenting an identified structure candidate utilizes inhibition of return (IOR) using a repulsive prior to ensure that geometric fitting provides a different identified structure candidate at each repetition.

17. The system of claim 13, wherein a goodness fit is performed on the identified structure candidate prior to presenting the identified structure candidate.

18. The system of claim 13, wherein the geometric fitting includes utilizing an adaptive gradient ascent technique with automatic step-size selection that is convergent to a mode of a kernel-smoothed estimate of a Gaussian function surface.

19. A computer system comprising:

a processor; and a program storage device readable by the computer system, embodying a program of instructions executable by the processor to perform method steps for identifying a structure of interest within image data, the method comprising:

receiving image data;

receiving an initial point within the received image data;

transforming the received image data into a scale-space;

performing geometric fitting using prior-constrained mean shift on the scale-space image data to identify a structure candidate in a vicinity of the initial point;

using the identified structure candidate to set up a prior constraint for subsequent iterations;

presenting the identified structure candidate to a user and querying the user to determine whether the identified structure candidate is a structure of interest; and when the identified structure candidate is determined to not be a structure of interest, repeating the steps of performing geometric fitting using prior-constrained mean shift and presenting an identified structure candidate until it is determined that an identified structure candidate is a structure of interest.

20. The computer system of claim 19, wherein each time the step of geometric fitting is performed, a new point is selected in place of the initial point, the new point being in proximity to the initial point such that a non-repetitive sequence of geometric structures are identified within the image data via an automatic exploration of the image data that starts from a vicinity of the initial point.

* * * * *